United States Patent
Fitzgerald (10) Patent No.: US 7,055,915 B2
(45) Date of Patent: *Jun. 6, 2006

(54) WHEEL WITH INTERCHANGEABLE COVER ELEMENTS

(75) Inventor: Kevin Fitzgerald, Long Beach, CA (US)

(73) Assignee: ZZYYXX Corp., Long Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/899,126

(22) Filed: Jul. 27, 2004

(65) Prior Publication Data

US 2004/0262981 A1 Dec. 30, 2004

Related U.S. Application Data

(63) Continuation of application No. 10/625,548, filed on Jul. 24, 2003, now Pat. No. 6,805,413.

(60) Provisional application No. 60/423,388, filed on Nov. 4, 2002.

(51) Int. Cl.
*B60B 7/00* (2006.01)

(52) U.S. Cl. ............... 301/37.106; 301/37.102

(58) Field of Classification Search ........... 301/37.106, 301/37.101, 37.102, 37.107, 37.28, 37.371, 301/37.42, 37.41; D12/204, 211
See application file for complete search history.

(56) References Cited

U.S. PATENT DOCUMENTS

| | | | |
|---|---|---|---|
| 1,487,904 A * | 3/1924 | Walters et al. ......... 301/64.201 |
| 1,936,725 A | 11/1933 | Miller | |
| 1,964,129 A | 6/1934 | Miller | |
| 1,966,827 A | 7/1934 | Miller | |
| 2,123,099 A * | 7/1938 | Eksergian et al. ........ 301/35.59 |
| 2,145,377 A | 1/1939 | Sinclair | |
| 2,420,320 A * | 5/1947 | Lyon ..................... 301/37.106 |
| 3,051,276 A * | 8/1962 | Lyon ..................... 188/264 W |
| 3,336,084 A | 8/1967 | Fenton | |
| 4,178,041 A | 12/1979 | Rush | |
| 4,295,685 A | 10/1981 | Spisak | |
| 4,316,637 A | 2/1982 | Reynolds et al. | |
| 4,781,419 A | 11/1988 | Boothe | |
| 4,971,396 A | 11/1990 | Morris | |
| 5,152,584 A | 10/1992 | Maxwell, Jr. | |
| 5,222,785 A | 6/1993 | Green | |
| 5,443,582 A | 8/1995 | Ching | |
| 5,645,324 A | 7/1997 | Wright et al. | |
| 5,820,225 A | 10/1998 | Ferris | |
| 6,089,671 A | 7/2000 | Iacovelli et al. | |
| D438,166 S * | 2/2001 | Noreiga .................... D12/211 |

(Continued)

*Primary Examiner*—Jason R. Bellinger
(74) *Attorney, Agent, or Firm*—Dykema Gossett PLLC (57) ABSTRACT

A wheel upon which interchangeable components may be mounted to the change the appearance thereof, is provided. The wheel may include a base wheel skeleton including a rim, a hub and spokes. Each spoke may include threaded holes adjacent the rim. Additional threaded holes may be disposed generally around a periphery of the hub. A hub cap may be attachable to the wheel on a first side of the wheel and include mounting extensions for attachment of the hub cap to the threaded holes around hub. Skin elements may be attachable to the wheel and include holes for attachment of one end of the skin element to one of the threaded holes adjacent the connection of the spokes to the rim. The skin elements may further include an extension disposable under a portion of the hub cap for retention of another end of the skin element by the hub cap.

11 Claims, 9 Drawing Sheets

U.S. PATENT DOCUMENTS

D438,505 S    *  3/2001   McMath ................... D12/211
6,419,327 B1     7/2002   Renshaw
6,439,670 B1     8/2002   Winters
6,663,189 B1 *  12/2003   Enomoto et al. ........ 301/37.36
6,672,676 B1     1/2004   Zaniboni
6,758,532 B1 *   7/2004   Rhee ...................... 301/37.43
6,805,413 B1 *  10/2004   Fitzgerald ............. 301/37.106
2001/0048241 A1 12/2001   Yoshimura

* cited by examiner

WHEEL WITH INTERCHANGEABLE COVER ELEMENTS

RELATED APPLICATIONS

This application is a continuation and claims benefit of priority of patent application Ser. No. 10/625,548, filed Jul. 24, 2003, now U.S. Pat. No. 6,805,413 B2, and Provisional Application Ser. No. 60/423,388, filed Nov. 4, 2002, hereby incorporated by reference in their entirety.

BACKGROUND OF INVENTION a. Field of Invention

The invention relates generally to wheels, and, more particularly to interchangeable wheels for automobiles and the like, wherein the wheels include outer skin elements and/or caps removably affixed to a wheel skeleton, thus enabling the appearance and functionality of the wheel to be changed.

b. Description of Related Art

Since the invention of the automobile, there has been an increasing demand by consumers and automobile manufactures for wheels and wheel covers having intricate surface patterns. An economical and efficient method of meeting such demands is to provide wheels which can be easily and economically manufactured by the millions. Such wheels can then be then be mounted onto an automobile by a manufacturer at the manufacturing facility, at the point of sale, or thereafter at the consumer's own expense. This approach has apparent dificiencies which include, for example, the waste involved in disposal of the replaced wheels, and the costs absorbed by a manufacturer for storage of replacement wheels.

Another approach in meeting such demands is to provide wheel skeletons on which interchangeable facial components can be affixed to give the wheel a unique appearance, without the need for replacing and/or removing a wheel once mounted on an automobile. This approach has historically had limited consumer response due to the relatively limited variety of wheels on the market which enable attachment of such facial components. Moreover, this approach has had inherent drawbacks with regard to the durability of wheels and associated components, the ease of manufacture and installation of such components, as well as the the susceptibility of such wheel designs to environmental factors.

Accordingly, there exists a need for a wheel design, which is efficient and economical to manufacture and modify, which provides a consumer with the desired versatility needed to modify the wheel for a unique appearance as needed, and which has the durability required against wear and tear, as well as environmentally related factors.

SUMMARY OF INVENTION

The invention solves the problems and overcomes the drawbacks and disadvantages of the prior art by providing a novel wheel assembly including a skeleton on which a plurality of wheel skin elements and/or caps may be removably affixed.

Specifically, the invention provides a wheel including a base wheel skeleton including a rim, a hub and a plurality of spokes for connecting the rim to the hub. Each of the spokes may include at least two threaded holes adjacent the connection of the spokes to the rim. At least two additional threaded holes may be disposed generally around a periphery of the hub and may be generally symmetrically spaced radially and angularly around the periphery of the hub. A hub cap may be attachable to the wheel on a first side of the wheel and include at least one mounting extension for attachment of the hub cap to the threaded holes disposed generally around the periphery of the hub. At least one skin element may be attachable to the wheel and include at least one hole for attachment of one end of the skin element to one of the threaded holes adjacent the connection of the spokes to the rim. The skin element may further include an extension disposable under a portion of the hub cap to facilitate retention of another end of the skin element by the hub cap. A surface of each of the spokes on the first side of the wheel may remain exposed after attachment of the hub cap and the skin element.

For the wheel described above, each of the spokes may include at least one longitudinally extending rib on a surface thereof. The hub cap may include at least two edges contiguously engagable with at least two complementary edges of the skin element. The hub cap and the skin element may be spaced from the wheel by means of spacers mountable between the respective holes in the hub cap and the skin element, and the threaded holes in the spokes and the hub.

The invention further provides a wheel including a base wheel skeleton including a rim, a hub and a plurality of spokes for connecting the rim to the hub. Each of the spokes may include at least two threaded holes adjacent the connection of the spokes to the rim. At least two additional threaded holes may be disposed generally around a periphery of the hub and may be generally symmetrically spaced radially and angularly around the periphery of the hub. A hub cap may be attachable to the wheel on a first side of the wheel and may include at least one mounting extension for attachment of the hub cap to the threaded holes disposed generally around the periphery of the hub. At least one skin element may be attachable to the wheel and may include at least one hole for attachment of one end of the skin element to one of the threaded holes adjacent the connection of the spokes to the rim. The skin element may further include an extension for engagement with a respective indentation in the hub cap to facilitate retention of another end of the skin element by the hub cap. A surface of each of the spokes on the first side of the wheel may be substantially covered by the skin element after attachment of the hub cap and the skin element.

The invention yet further provides a method of changing the appearance of a wheel. The wheel may include a base wheel skeleton including a rim, a hub and a plurality of spokes for connecting the rim to the hub. Each of the spokes may include at least two threaded holes adjacent the connection of the spokes to the rim. At least two additional threaded holes may be disposed generally around a periphery of the hub and may be generally symmetrically spaced radially and angularly around the periphery of the hub. The method may include mounting a hub cap to the wheel on a first side of the wheel. The hub cap may include at least one mounting extension for attachment of the hub cap to the threaded holes disposed generally around the periphery of the hub. The method may further include mounting at least one skin element to the wheel. The skin element may include at least one hole for attachment of one end of the skin element to one of the threaded holes adjacent the connection of the spokes to the rim. The skin element may further include an extension for engagement with a portion of the hub cap to facilitate retention of another end of the skin element by the hub cap.

For the method described above, for one configuration of the wheel, a surface of each of the spokes on the first side of the wheel may remain exposed after attachment of the hub cap and the skin element. For another configuration of the wheel, a surface of each of the spokes on the first side of the wheel may be substantially covered by the skin element after attachment of the hub cap and the skin element. Each of the spokes may include at least one longitudinally extending rib on a surface thereof. The surface of the spoke may be disposed on the same side as the first side of the wheel. The method may further include contiguously engaging at least two edges of the hub cap with at least two complementary edges of the skin element, and spacing the hub cap and the skin element from the wheel by means of spacers mountable between the respective holes in the hub cap and the skin element, and the threaded holes in the spokes and the hub.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENT

Figure 1:
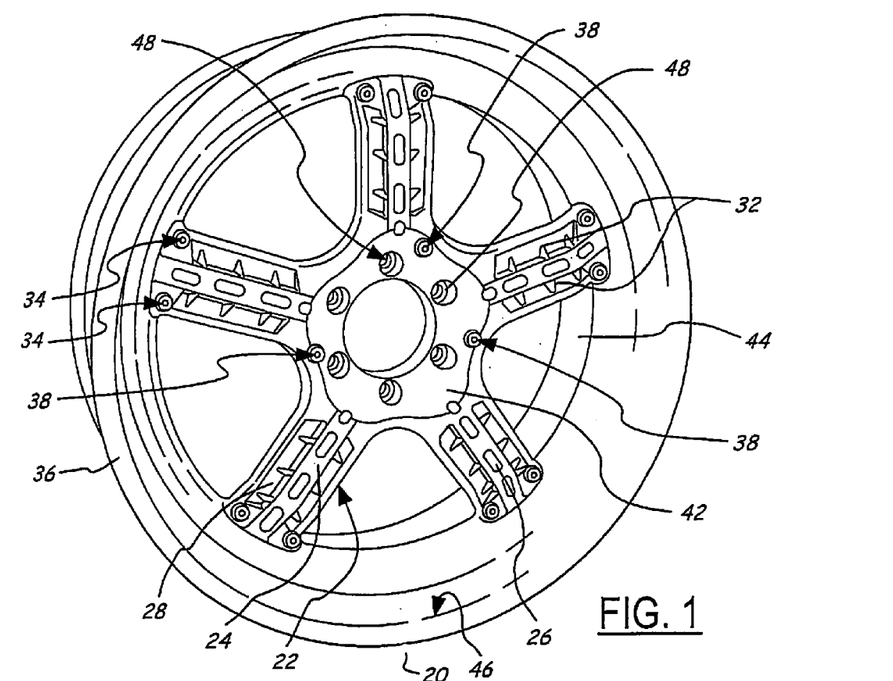
FIG. 1 is an isometric front view of a wheel skeleton according to the present invention.
Figure 2:
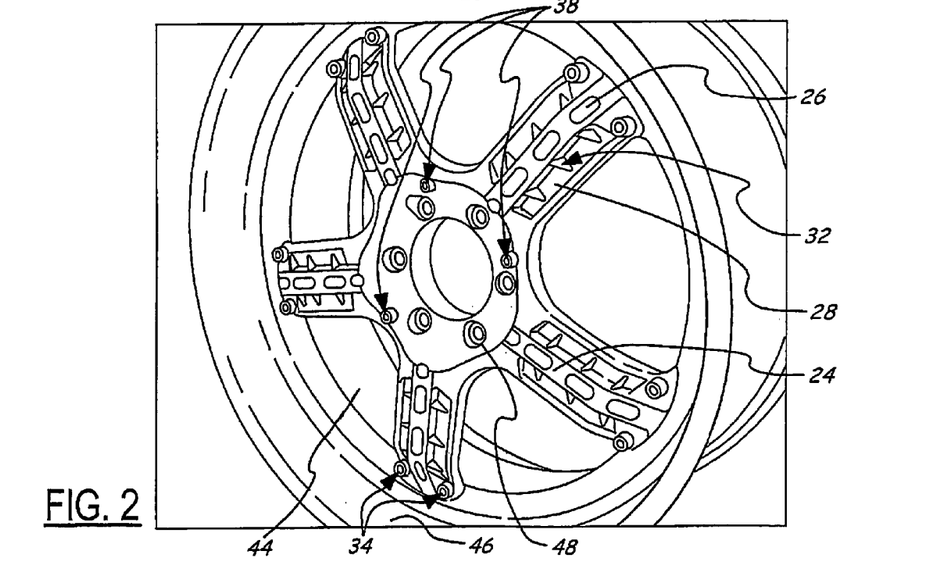
FIG. 2 is an isometric view from a different angle of the wheel skeleton of FIG. 1.

Referring now to the drawings wherein like reference numerals designate corresponding parts throughout the several views, FIGS. 1–2 illustrate a wheel skeleton according to the present invention, generally designated 20.

As shown in FIGS. 1–2, 3A and 3B, wheel skeleton 20 may include a plurality of spokes 22 formed therein, for example, in a pentagonal orientation. It is foreseeable that other orientations, such as hexagonal, octagonal, etc., may be used as needed. Each spoke 22 may include a raised central rib portion 24 having indentations 26 formed therein for added rigidity. A channel 28 may be provided on each side of rib portion 24 for additional rigidity. Each channel 28 may include a plurality of angularly disposed nibs 32 extending from rib portion 24. Two or more threaded holes 34 may be provided adjacent the intersection surface of each spoke 22 and rim 36. As described below, threaded holes 34 may be used to facilitate the assembly of wheel skin elements 54, 102 and 126. Additional threaded holes 38 may be provided adjacent the outer circumference of hub 42. As described below, threaded holes 38 may be used to facilitate the assembly of caps 52 and 124. A generally flat surface 44 may provide a transition surface between spokes 22 and the inner surface 46 of rim 36. Surface 44 may be disposed at a predetermined angle relative to surface 46 (described in greater detail below). Holes 48 may be provided in the usual manner for attachment of wheel skeleton 20 to an automobile and the like.

Figure 3A:
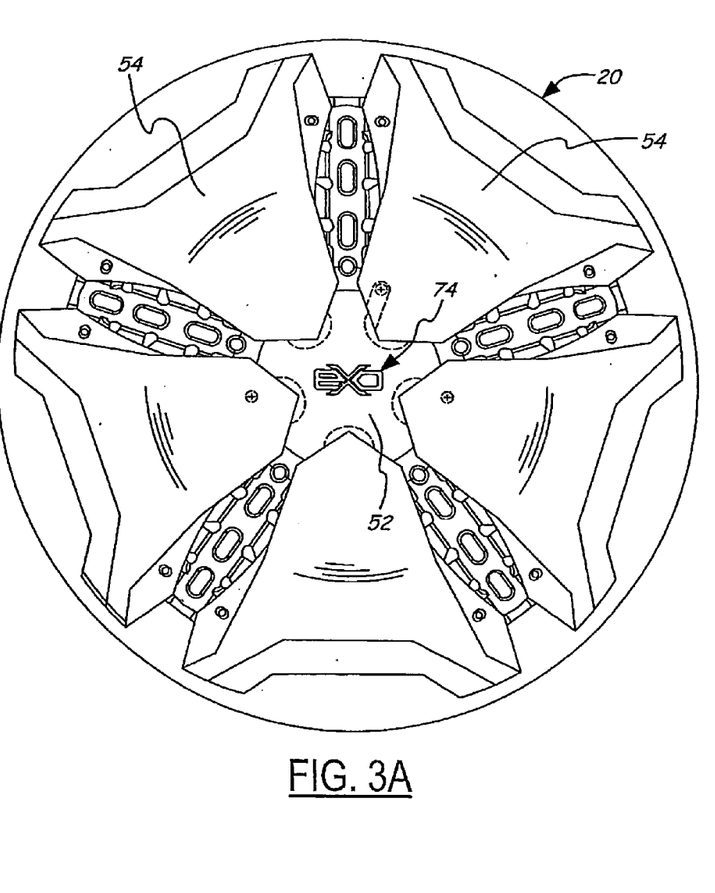
FIG. 3A is a front view of a first assembly of a first embodiment of a cap and a skin element, each mounted on the wheel skeleton of FIG. 1.
Figure 3B:
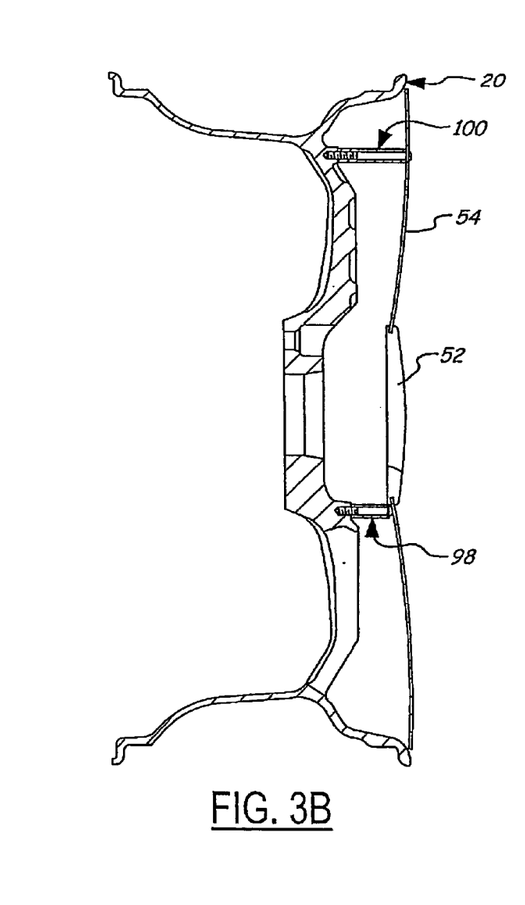
FIG. 3B is a side view of the assembly of FIG. 3A.

Referring next to FIGS. 3A and 3B, a first assembly of a first embodiment of a cap 52 and skin elements 54, each mounted on wheel skeleton 20, is illustrated. Referring to FIGS. 3A, 3B and 4A–4D, cap 52 is illustrated in greater detail.

Figures 4A, 4C, 4D:
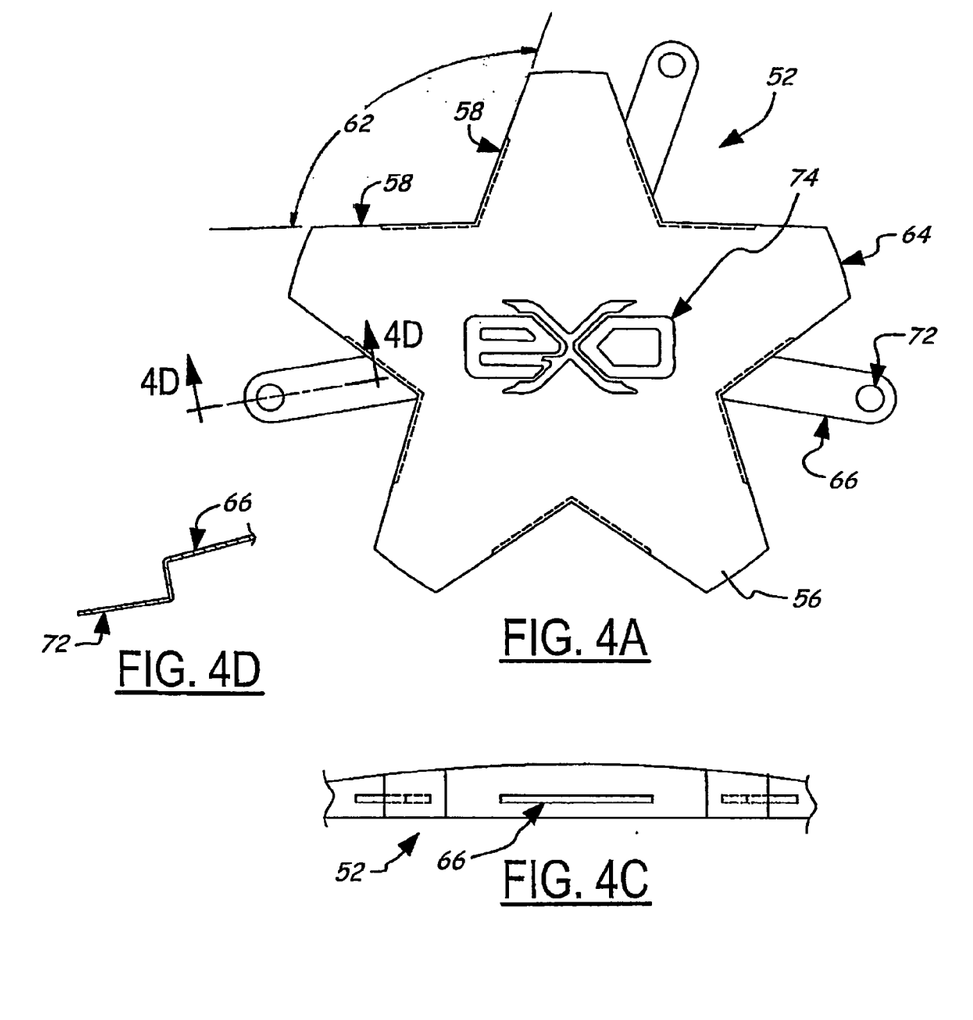
FIG. 4A is a front view of the first embodiment of the cap of FIG. 3A.
FIG. 4C is a cutout of a bottom view of the cap of FIG. 4A.
FIG. 4D is a sectional view of a mounting extension, taken along section 4D—4D in FIG. 4A.
Figure 4B:
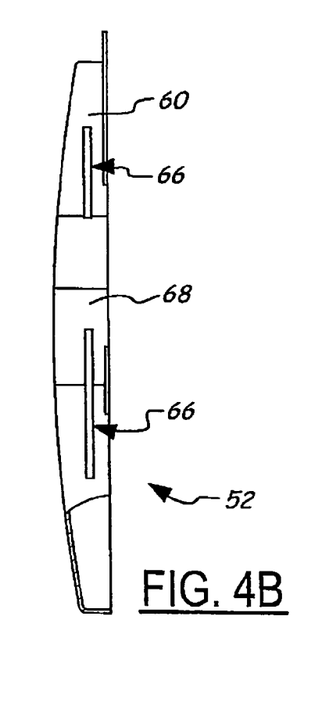
FIG. 4B is a right-side view of the cap of FIG. 4A.

As shown in FIGS. 4A–4D, cap 52 may include a plurality of protrusions 56 in a pentagonal configuration. Each protrusion 56 may include edges 58 disposed at a predetermined angle 62 of approximately 112°, for example. It is foreseeable that angle 62 may be of a different dimension, as would be apparent to a skilled artisan. Each protrusion 56 may include generally perpendicular surfaces 60 for facilitating orientation of skin elements 54 adjacent cap 52. The outer surfaces 64 of each protrusion 56 may be rounded or flat. A plurality of mounting extensions 66 may be fixedly mounted to generally perpendicular surface 68 of cap 52 for mounting cap 52 to wheel skeleton 20. Mounting extensions 66 may include a bent configuration as shown in FIG. 4D. Each mounting extension 66 may include a hole 72 for insertion of a threaded screw (now shown). A logo sticker 74 may be affixed to a central surface of cap 52.

Figures 5A, 5B, 5C, 6A, 6B:
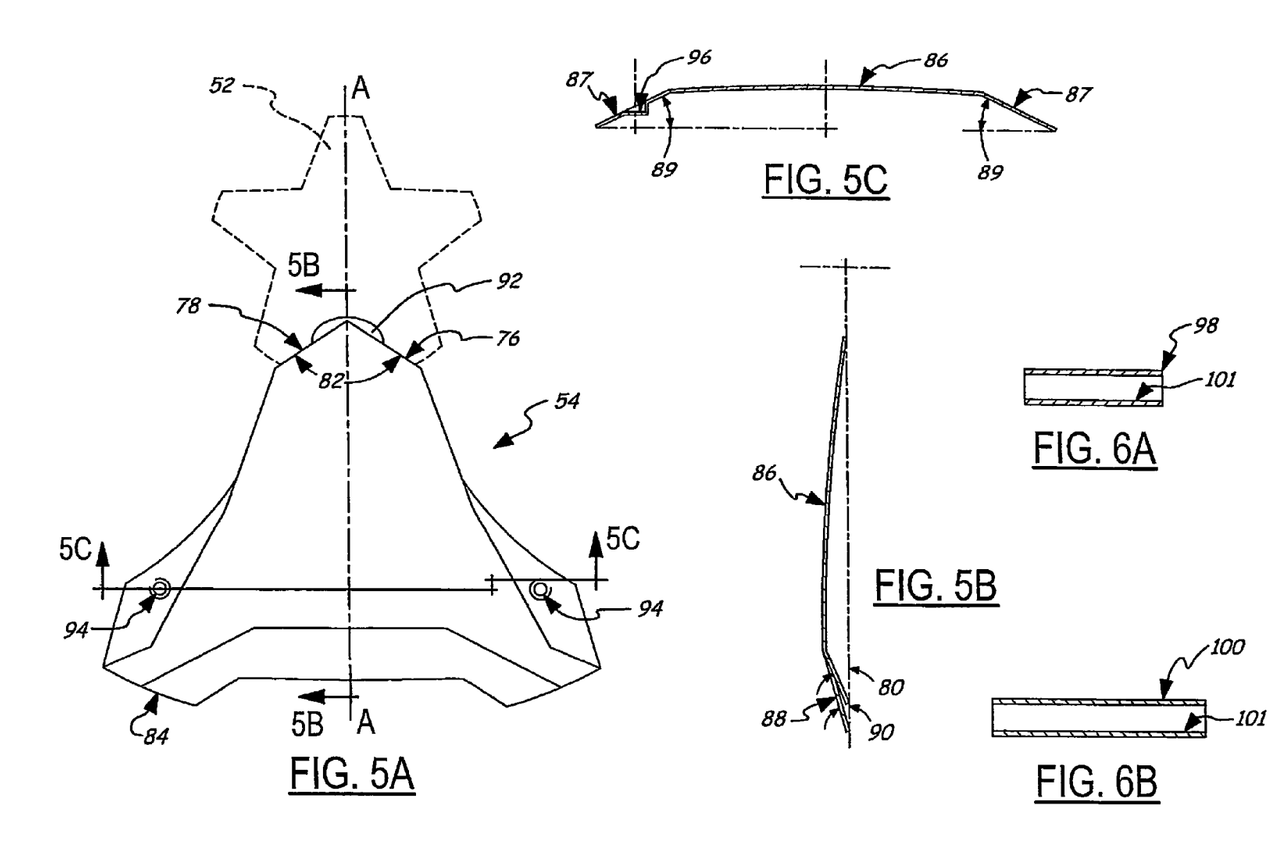
FIG. 5A is a front view of the first embodiment of the skin element of FIG. 3A, including a phantom-view of the cap of FIG. 3A.
FIG. 5B is a sectional view of the skin element of FIG. 5A, taken along section 5B—5B in FIG. 5A.
FIG. 5C is a sectional view of the skin element of FIG. 5A, taken along section 5C—5C in FIG. 5A.
FIG. 6A is an illustrative cutout of a first spacer according to the present invention.
FIG. 6B is an illustrative cutout of a second spacer according to the present invention.

Referring to FIGS. 5A–5C, the first embodiment of skin element 54 is illustrated. Skin element 54 may include a plurality of angled surfaces (described below) disposed in a generally mirrored configuration relative to axis-A. Specifically, skin element 54 may include edges 76 and 78 disposed at an angle 82 of approximately 112°, for example, for complementary engagement with edges 58 of cap 52. It is foreseeable that angle 82 may be of a different dimension, as would be apparent to a skilled artisan. Additional curved edges 84 may be provided for overlapping engagement with rim 36. A first top surface 86 of skin element 54 may be sloped at an angle 80 of approximately 25°, for example, as shown in FIG. 5B. Edges 87 of top surface 86 may be sloped at an angle 89 of approximately 25°, for example, as shown in FIG. 5C. A second top surface 88 of skin element 54 may be sloped at an angle 90 of approximately 17°, for example, as shown in FIG. 5B. A rounded protrusion 92 may be provided adjacent edges 76 and 78 for protruding under cap 52 for facilitating retention of skin element 52, and for preventing the entry of dirt and other contaminants between cap 52 and skin element 54. Holes 94 may be provided in radial and angular alignment with threaded holes 34 on wheel skeleton 20 for affixation of skin element 54 to wheel skeleton 20. An indented surface 96 may be provided in the vicinity of holes 94 for permitting the head of a screw to rest thereon. The remaining edges and surfaces of skin element 54 may be provided as illustrated in FIGS. 5A–5C.

Referring to FIGS. 3A, 3B, 6A, 6B, 7A and 7B, first and second spacers 98 and 100, respectively, may be provided for proper spacing and alignment of cap 52, and skin elements 54 and 102 (described below), respectively, from threaded holes 38 and 34, respectively, on wheel skeleton 20. Each spacer 98 and 100 may include a hole 101 formed therein for insertion of a screw (not shown) for mounting cap 52, and skin elements 54 and 102, respectively. In the exemplary embodiment of FIGS. 3A and 3B, first and second spacers 98 and 100, respectively, may have an internal diameter of approximately 0.5" and an external diameter of approximately 3/8", an axial length of approximately 1.3" for mounting cap 52 (i.e. for first spacer 98), and an axial length of approximately 2.0" for mounting skin elements 54 (i.e. for second spacer 100). In the exemplary embodiment of FIGS. 7A and 7B (described below), first and second spacers 98 and 100, respectively, may have an internal diameter of approximately 0.5" and an external diameter of approximately 3/8", an axial length of approximately 1.5" for mounting cap 52 (i.e. for first spacer 98), and an axial length of approximately 2.6" for mounting skin elements 102 (i.e. for second spacer 100). It is foreseeable that spacers 98 and 100 may be dimensioned in a different manner in accordance with the required spacing for cap 52, and skin elements 54 and 102, as would be apparent to a skilled artisan.

As shown in FIGS. 3A and 3B, in order to assemble cap 52 and skin element 54 onto wheel skeleton 20, cap 52 may first be positioned on hub 42. Holes 72 on mounting extension 66 may be aligned with threaded holes 38 on wheel skeleton 20. First spacers 98 may be utilized for aligning and adequately spacing each of the mounting extensions 66 of cap 52 from hub 42. Adequate screws (not shown) may be utilized within holes 72 of mounting extensions 66 for affixation of cap 52 onto hub 42 of wheel skeleton 20. Likewise, second spacers 100 may be utilized for aligning and adequately spacing each skin elements 54 onto wheel skeleton 20. Protrusion 92 on each skin element 54 may be inserted under cap 52. Thereafter, adequate screws (not shown) may be utilized within holes 94 of skin elements 54 for affixation thereof onto wheel skeleton 20.

Figure 7A:
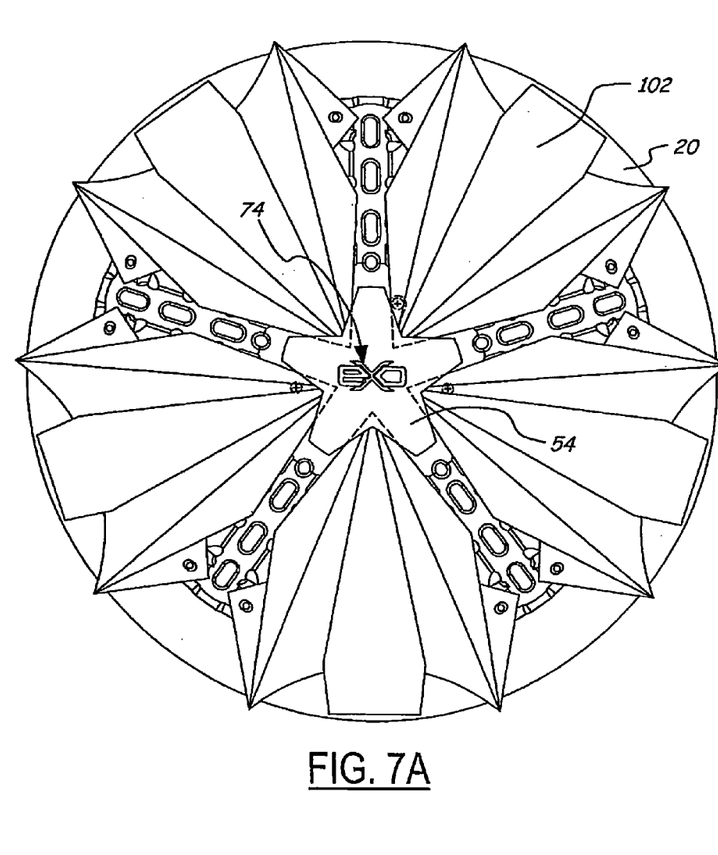
FIG. 7A is a front view of a second assembly of the first embodiment of the cap and a second embodiment of a skin element, each mounted on the wheel skeleton of FIG. 1.
Figure 7B:
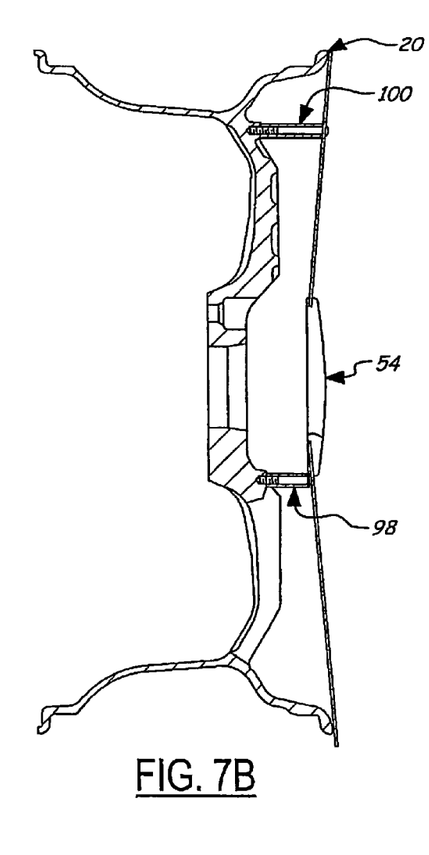
FIG. 7B is a side view of the assembly of FIG. 7A.
Figure 8A:
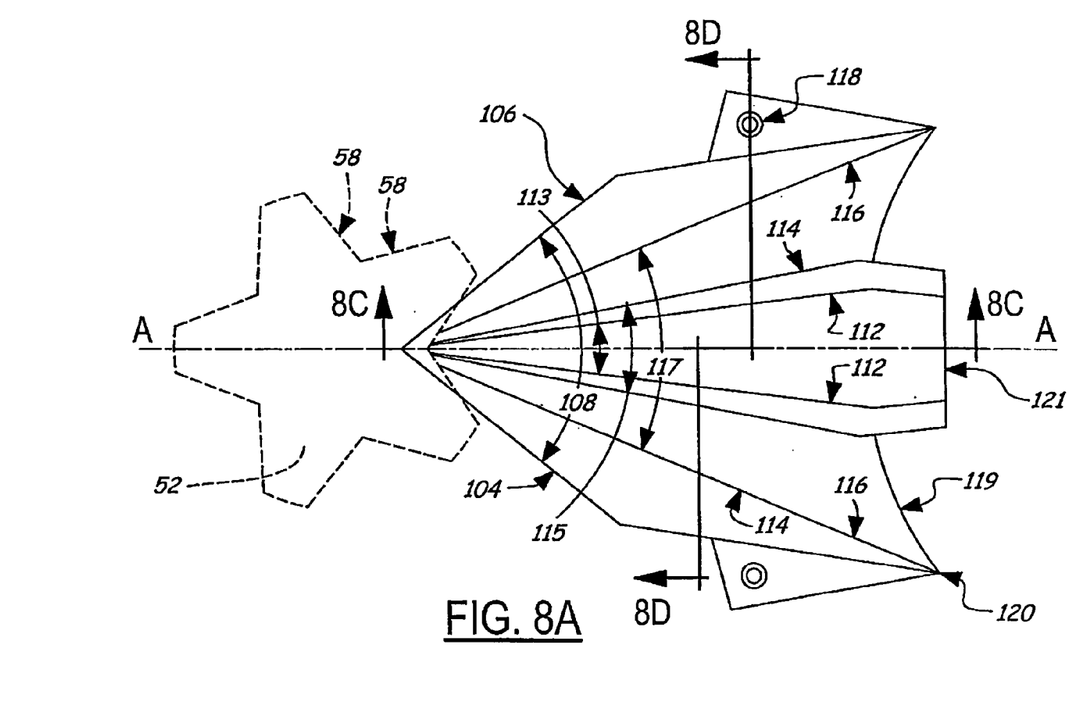
FIG. 8A is a front view of the second embodiment of the skin element of FIG. 7A, including a phantom-view of the cap of FIG. 7A.
Figure 8B:
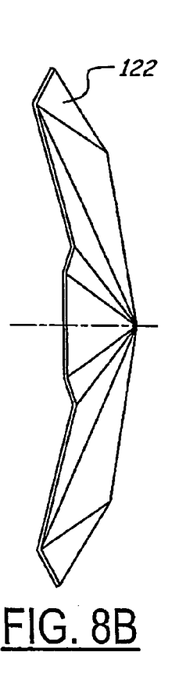
FIG. 8B is a right-side view of the skin element of FIG. 8A.
Figure 8C:
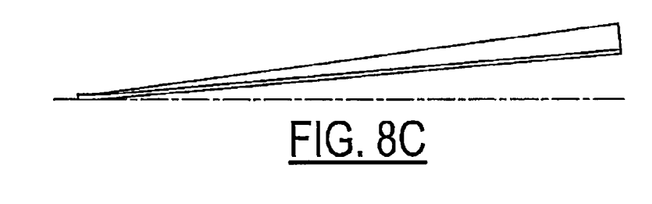
FIG. 8C is a sectional view of the skin element of FIG. 8A, taken along section 8C—8C in FIG. 8A.
Figure 8D:
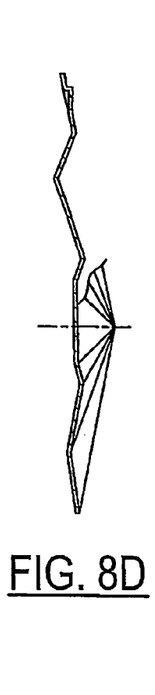
FIG. 8D is a sectional view of the skin element of FIG. 8A, taken along section 8D—8D in FIG. 8A.

Referring next to FIGS. 7A and 7B, a second assembly of the first embodiment of cap 52 and a second embodiment of skin elements 102, each mounted on wheel skeleton 20, is illustrated. The cap used in the assembly for FIGS. 7A and 7B is identical to cap 52, described above in reference to FIGS. 4A–4D.

Referring to FIGS. 7A, 7B and 8A–8D, the second embodiment of skin element 102 is illustrated. Skin element 102 may include a plurality of angled surfaces (described below) disposed in a generally mirrored configuration relative to axis-A. Specifically, skin element 102 may include edges 104 and 106 disposed at an angle 108 of approximately 77°, for example, for protruding under cap 52 for facilitating retention of skin element 102, and for preventing the entry of dirt and other contaminants between cap 52 and skin element 102. It is foreseeable that angle 108 may be of a different dimension, as would be apparent to a skilled artisan. A plurality of additional edges 112, 114 and 116 may be provided on each side of axis-A and have angles 113, 115 and 117, respectively, of approximately 14°, 22° and 45°, respectively, therebetween, for providing rigidity to the structure of skin element 102, and for preventing entry of dirt and other contaminants between skin element 102 and wheel skeleton 20. Skin element 102 may also include a curved surface 119 for providing rigidity to the structure of skin element 102 and for preventing entry of dirt and other contaminants thereunder. Holes 118 may be provided in radial and angular alignment with threaded holes 34 on wheel skeleton 20 for affixation of skin element 102 to wheel skeleton 20. The surface 122 adjacent holes 118 may be inclined or may be flat, as illustrated in FIG. 5C for skin element 54. Alternatively, an indented surface may be provided in the vicinity of holes 118 for permitting the head of a screw (not shown) to rest thereon. Edges 120 may be provided on skin clement 102 for overlapping rim 36 of wheel skeleton 20. Additionally, an edge 121 may be provided on skin element 102 for fitting within the outer diameter of rim 36. The remaining edges and surfaces of skin element 102 may be provided as illustrated in FIGS. 8A–8D.

As shown in FIGS. 7A and 7B, in order to assemble cap 52 and skin element 102 onto wheel skeleton 20, cap 52 may first be positioned on hub 42. Holes 72 on mounting extension 66 may be aligned with threaded holes 38 on wheel skeleton 20. First spacers 98 may be utilized for aligning and adequately spacing each of the mounting extensions 66 of cap 52 from hub 42. Adequate screws (not shown) may be utilized within holes 72 of mounting extensions 66 for affixation of cap 52 onto hub 42 of wheel skeleton 20. Likewise, second spacers 100 may be utilized for aligning and adequately spacing each skin elements 102 onto wheel skeleton 20. The edge formed by the intersection of edges 104 and 106 on each skin element 102 may be inserted under cap 52. Thereafter, adequate screws (not shown) may be utilized within holes 118 of skin elements 102 for affixation thereof onto wheel skeleton 20.

Figure 9A:
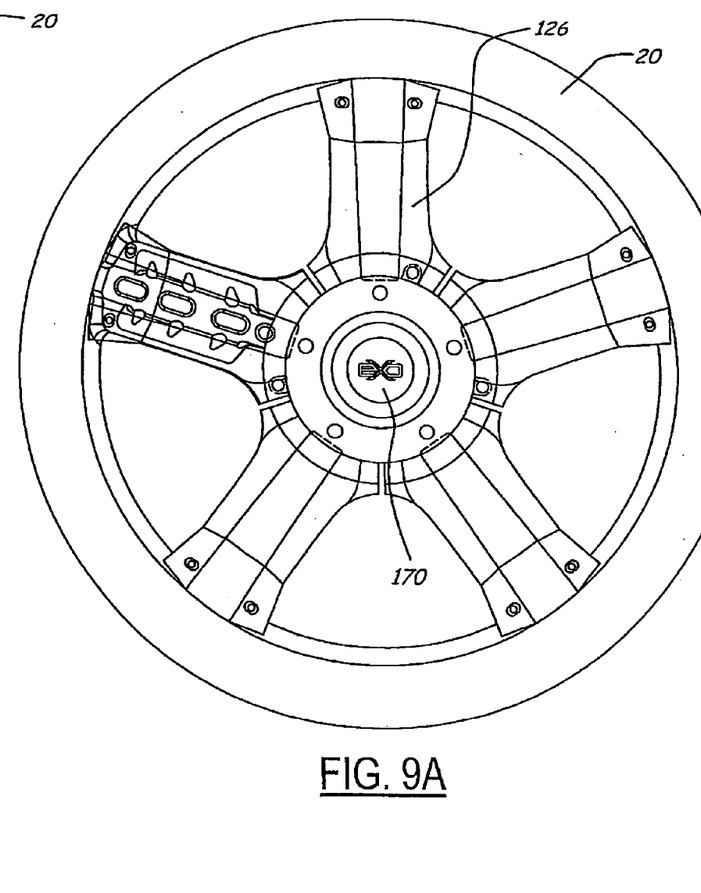
FIG. 9A is a front view of a third assembly of a second embodiment of a cap and a third embodiment of a skin element, each mounted on the wheel skeleton according of FIG. 1.
Figure 9B:
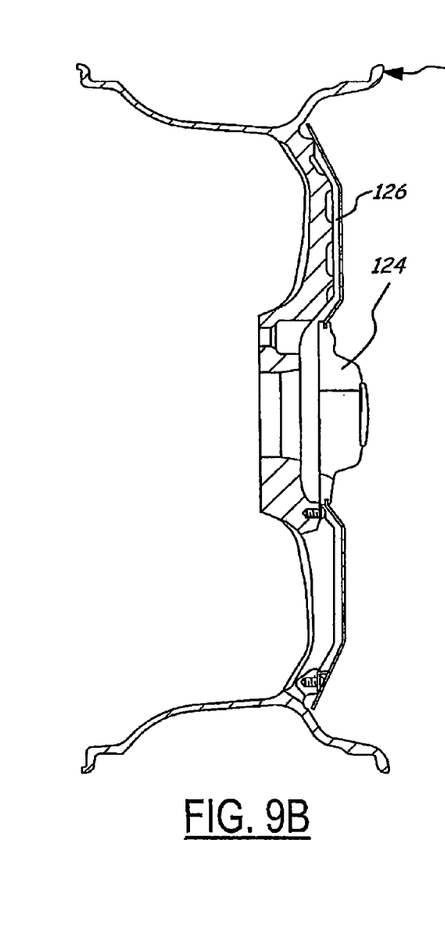
FIG. 9B is a side view of the assembly of FIG. 9A.

Referring next to FIGS. 9A and 9B, a third assembly of a second embodiment of a cap 124 and a third embodiment of a skin element 126, each mounted on wheel skeleton 20, is illustrated. Referring to FIGS. 10A–10D, cap 124 is illustrated in greater detail.

Figures 10A, 10C, 10D:
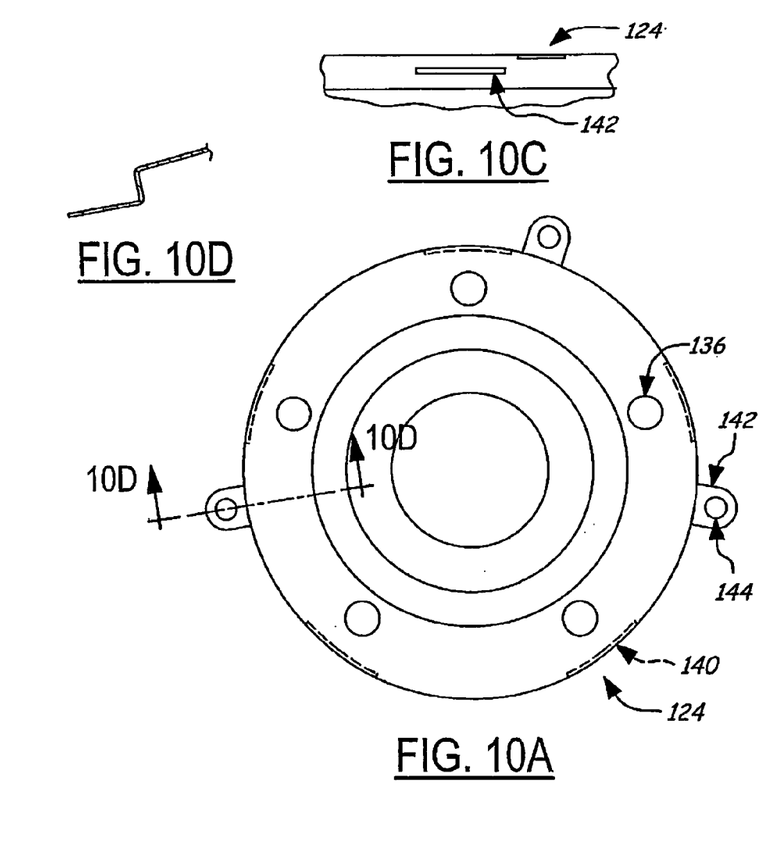
FIG. 10A is a front view of the second embodiment of the cap of FIG. 9A.
FIG. 10C is a partial top view of the cap of FIG. 10A.
FIG. 10D is a sectional view of a mounting extension, taken along section 10D—10D in FIG. 10A.
Figures 10B, 12B:
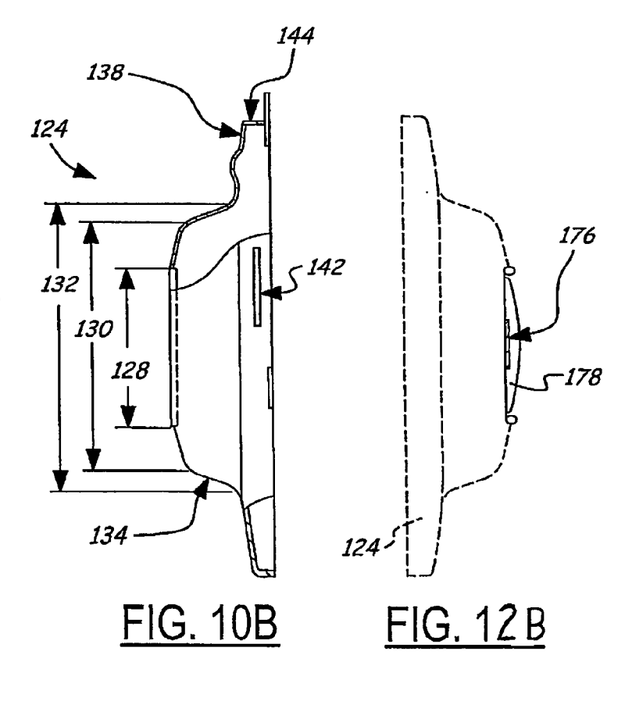
FIG. 10B is a right-side view of the cap of FIG. 10A.
FIG. 12B is a side view of the logo of FIG. 12A, and a phantom-view of the cap of FIG. 9A.
Figure 11A:
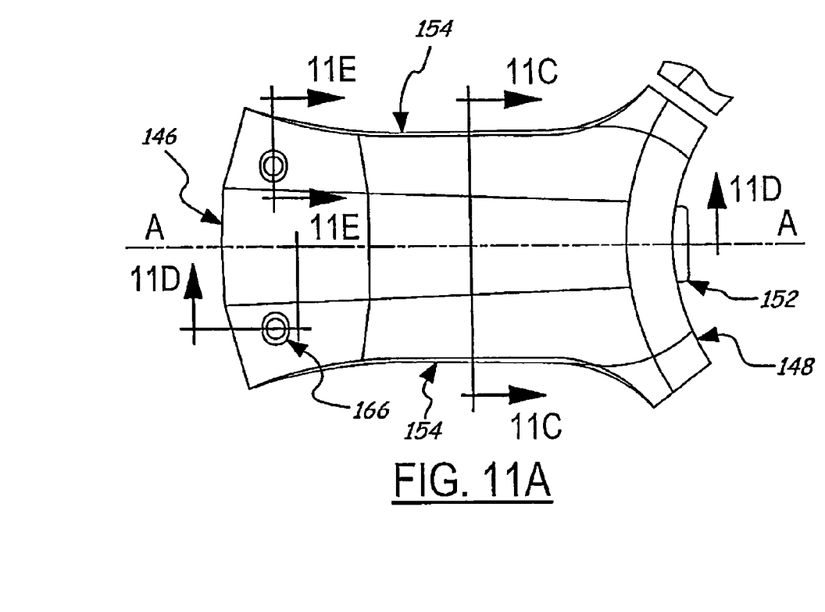
FIG. 11A is a front view of the third embodiment of the skin element of FIG. 9A.
Figure 11B:
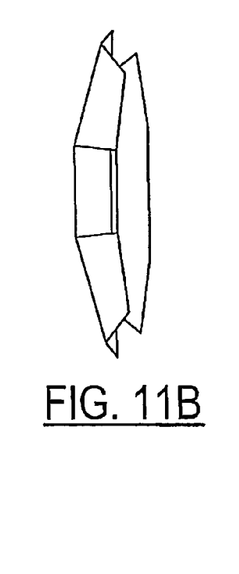
FIG. 11B is a side view of the skin element of FIG. 11A.
Figure 11C:
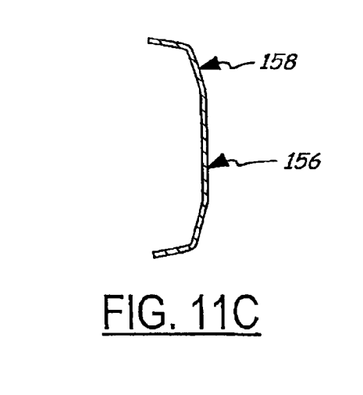
FIG. 11C is a sectional view of the skin element of FIG. 11A, taken along section 11C—11C in FIG. 11A.
Figure 11D:
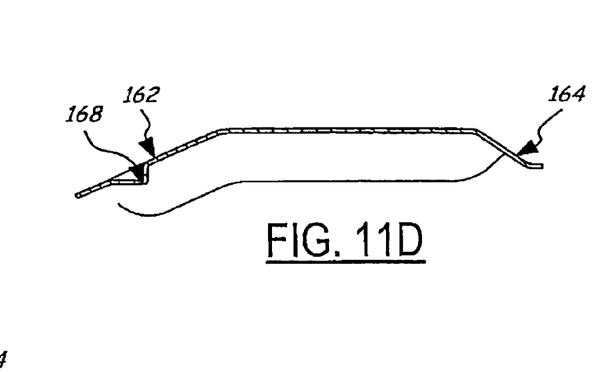
FIG. 11D is a sectional view of the skin element of FIG. 11A, taken along section 11D—11D in FIG. 11A.
Figure 11E:
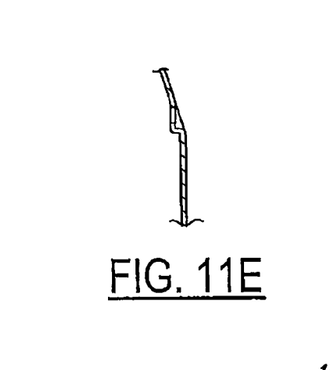
FIG. 11E is a sectional view of the skin element of FIG. 11A, taken along section 11E—11E in FIG. 11A.

As shown in FIGS. 10A–10D, cap 124 may be formed of a generally circular configuration. Specifically, as shown in FIG. 10B, cap 124 may include first, second and third circular rings 128, 130 and 132, respectively. Rings 128, 130 and 132 may have an outer diameter of approximately 2.3", 3.7" and 4.3", respectively, for example. It is foreseeable that the diameter of rings 128, 130 and 132 could be changed as needed, as would be apparent to a skilled artisan. Ring 128 may include an indented central surface for facilitating alignment of logo 170 (described below). Rings 130 and 132 may include an angular surface 134 therebetween for facilitating removal of dirt and contaminants from cap 124. A plurality of angularly disposed bumps 136 may be provided on surface 138 of cap 124. Additionally, a plurality of mounting extensions 142 may be fixedly mounted to generally perpendicular outer surface 144 of cap 124, for facilitating mounting of cap 124 to wheel skeleton 20. Mounting extensions 142 may include a bent configuration as shown in FIG. 10D. Each mounting extension 142 may include a hole 145 for insertion of a threaded screw (now shown). Angularly disposed indentations 140 may be provided in cap 124 for engagement with protrusions 152 (described below) on skin element 126.

Referring to FIGS. 11A–11E, the third embodiment of skin element 126 is illustrated. Skin element 126 may include a plurality of angled surfaces (described below) disposed in a generally mirrored configuration relative to axis-A. Specifically, skin element 126 may include an outer generally flat edge 146 and an inner generally circular surface 148. Outer edge 146 may be dimensioned to engage inner surface 46 of rim 36, and protrusions 152 on inner surface 148 may engage indentations 140 in cap 124. Curved surfaces 154 may be provided on skin element 126 for substantially covering the profile of spokes 22 on wheel skeleton 20, and for preventing entry of dirt and other contaminants between skin element 126 and spokes 22 of wheel skeleton 20. The outer profile of skin element 126 may include generally flat surfaces 156 and 158 for preventing adhering of dirt and contaminants thereon. Additionally, sloped surfaces 162 and 164 may also be provided for preventing adhering of dirt and contaminants on skin element 126. Holes 166 may be provided in radial and angular alignment with threaded holes 34 on wheel skeleton 20 for affixation of skin element 126 to wheel skeleton 20. An indented surface 168 may be provided in the vicinity of holes 166 for permitting the head of a screw to rest thereon. The remaining edges and surfaces of skin element 126 may be provided as illustrated in FIGS. 11A–11E.

As shown in FIGS. 9A and 9B, in order to assemble cap 124 and skin element 126 onto wheel skeleton 20, cap 124 may first be positioned on hub 42. Holes 145 on mounting extension 142 may be aligned with threaded holes 38 on wheel skeleton 20. Adequate screws (not shown) may be utilized within holes 145 of mounting extensions 142 for affixation of cap 124 onto hub 42 of wheel skeleton 20. Protrusions 152 on each skin element 126 may be inserted into indentations 140 in cap 124. Thereafter, adequate screws (not shown) may be utilized within holes 166 of skin elements 126 for affixation thereof onto wheel skeleton 20.

Figure 12A:
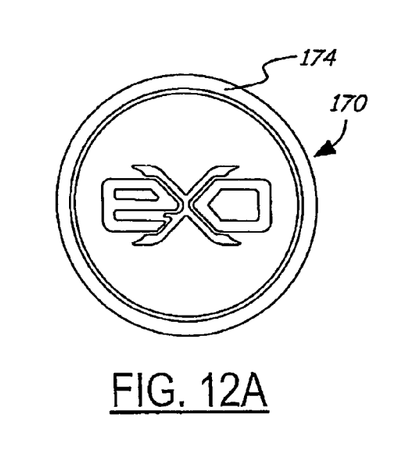
FIG. 12A is a front view of a logo according to the present invention.

Referring next to FIGS. 12A and 12B, logo 170 (described above) may include a circular member 174 and a text plate 176 encased within a clear covering 178. Logo 170 may include an adhesive backing for affixation thereof onto cap 124.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A wheel upon which a tire may be mounted, said wheel comprising:
    a base wheel skeleton including a rim, a hub and a plurality of spokes for connecting said rim to said hub, said plurality of said spokes including at least one first connector adjacent a connection of said spokes to said rim;
    at least two second connectors being disposed generally around a periphery of said hub; and
    at least one skin element being attachable to said wheel generally at opposite ends of said skin element, a first end of said skin element being attachable to said wheel by means of a complementary connector engageable with said first connector, a second opposite end of said skin element being attachable to said wheel adjacent said hub,
    wherein said second connectors are in the form of threaded holes, said threaded holes being generally symmetrically spaced radially and angularly around the periphery of said hub, each of said threaded holes being used for attachment of a hub cap.

2. A wheel according to claim 1, further comprising at least two first connectors in the form of threaded holes, each of said threaded holes being respectively used for attachment of adjacently disposed skin elements.

3. A wheel according to claim 2, wherein said complementary connector is a screw engageable with said first connector.

4. A wheel according to claim 1, further comprising at least two first connectors in the form of threaded holes, each of said threaded holes being used for attachment of a skin element.

5. A wheel according to claim 4, wherein said complementary connector is a screw engageable with said first connector.

6. A wheel upon which a tire may be mounted, said wheel comprising:
    a base wheel skeleton including a rim, a hub and a plurality of spokes for connecting said rim to said hub, said plurality of said spokes including at least one first connector adjacent a connection of said spokes to said rim;
    at least one second connector being disposed generally around a periphery of said hub;
    at least one skin element being attachable to said wheel generally at opposite ends of said skin element, a first end of said skin element being attachable to said wheel by means of a complementary connector engageable with said first connector, a second opposite end of said skin element being attachable to said wheel adjacent said hub; and a hub cap being attachable to said wheel on a first side of said wheel and including at least one mounting extension for attachment of said hub cap to said second connector.

7. A wheel according to claim 6, wherein said skin element further including an extension disposable under a portion of said hub cap to facilitate retention of said second opposite end of said skin element by said hub cap.

8. A wheel according to claim 7, wherein a surface of each of said spokes on said first side of said wheel remains exposed after attachment of said hub cap and said skin element.

9. A wheel according to claim 6, wherein said skin element further including an extension for engagement with a respective indentation in said hub cap to facilitate retention of said second opposite end of said skin element by said hub cap.

10. A wheel according to claim 6, each of said spokes including at least one longitudinally extending rib on a surface thereof, said surface of said spoke being disposed on the same side as said first side of said wheel.

11. A wheel according to claim 6, said hub cap including at least two edges contiguously engagable with at least two complementary edges of said skin element.

* * * * *